United States Patent
Dufort et al.

(10) Patent No.: US 9,937,669 B2
(45) Date of Patent: Apr. 10, 2018

(54) THREE-DIMENSIONAL PRINTED PART REMOVAL USING A BIMETALLIC PLATEN

(71) Applicant: Xerox Corporation, Norwalk, CT (US)

(72) Inventors: Ron E. Dufort, Rochester, NY (US);
John T. Buzzelli, Walworth, NY (US);
Dara N. Lubin, Pittsford, NY (US);
Kevin St. Martin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 307 days.

(21) Appl. No.: 14/677,431

(22) Filed: Apr. 2, 2015

(65) Prior Publication Data

US 2016/0288423 A1    Oct. 6, 2016

(51) Int. Cl.
| | |
|---|---|
| B29C 67/00 | (2017.01) |
| G05B 19/18 | (2006.01) |
| B29C 64/20 | (2017.01) |
| B29C 64/386 | (2017.01) |
| B33Y 50/02 | (2015.01) |
| B33Y 30/00 | (2015.01) |

(52) U.S. Cl.
CPC .......... *B29C 67/0088* (2013.01); *B29C 64/20* (2017.08); *B29C 64/386* (2017.08); *B33Y 30/00* (2014.12); *B33Y 50/02* (2014.12)

(58) Field of Classification Search
CPC . B29C 67/0088; B29C 67/0085; G05B 19/18; B33Y 10/00; B33Y 30/00; B33Y 50/00; B33Y 50/02
See application file for complete search history.

(56) References Cited

U.S. PATENT DOCUMENTS

| | | | |
|---|---|---|---|
| 4,052,217 A | 10/1977 | Watkinson | |
| 5,094,095 A | 3/1992 | Barrois et al. | |
| 5,141,680 A | 8/1992 | Almquist et al. | |
| 6,269,938 B1 | 8/2001 | Lutz | |
| 6,571,702 B2 | 6/2003 | Wotton et al. | |
| 8,911,199 B2 | 12/2014 | Herrmann et al. | |
| 9,248,600 B2 * | 2/2016 | Goodman | B29C 67/0088 |
| 9,592,660 B2 * | 3/2017 | Reese | B33Y 30/00 |
| 2013/0310192 A1 * | 11/2013 | Wahl | C25D 1/00 473/331 |
| 2014/0220168 A1 | 8/2014 | Perez et al. | |
| 2014/0265032 A1 | 9/2014 | Teicher et al. | |

(Continued)

OTHER PUBLICATIONS

"Table 13-1 Coefficients of Expansion", 2005, Pearson Prentice Hall, http://helios.augustana.edu/~dr/102/img/13_T01.jpg.*

*Primary Examiner* — Charles Kasenge
(74) *Attorney, Agent, or Firm* — Maginot Moore & Beck, LLP

(57) ABSTRACT

A three-dimensional object printer has a platen that is configured to facilitate the release of objects formed on the platen. The platen includes a first layer and second layer, the first layer having a coefficient of thermal expansion that is different than a coefficient of thermal expansion of the second layer. A controller in the printer is configured to operate at least one ejector in an ejector head to form a three-dimensional object on the surface of the platen with reference to digital image data and, upon completion of the object, to operate a temperature control device operatively connected to the platen to bend the platen by changing the temperature of the platen and releasing a three-dimensional object from the platen.

19 Claims, 3 Drawing Sheets

(56) References Cited

U.S. PATENT DOCUMENTS

| | | | |
|---|---|---|---|
| 2015/0343688 A1* | 12/2015 | Goodman | B29C 67/0088 264/39 |
| 2016/0176118 A1* | 6/2016 | Reese | B33Y 30/00 425/89 |
| 2016/0204078 A1* | 7/2016 | Bedell | H01L 24/83 156/247 |

* cited by examiner

US 9,937,669 B2

THREE-DIMENSIONAL PRINTED PART REMOVAL USING A BIMETALLIC PLATEN

TECHNICAL FIELD

The device and method disclosed in this document relates to three-dimensional object printing and, more particularly, to removal of a three-dimensional object from a platen on which the object was formed.

BACKGROUND

Digital three-dimensional object manufacturing, also known as digital additive manufacturing, is a process of making a three-dimensional solid object of virtually any shape from a digital model. Three-dimensional object printing is an additive process in which one or more ejector heads eject successive layers of material on a substrate in different shapes. Support materials, which are later removed, are often used to assist in printing complex shapes. The substrate is supported either on a platform that can be moved three dimensionally by operation of actuators operatively connected to the platform, or the ejector heads are operatively connected to one or more actuators for controlled movement of the ejector heads to produce the layers that form the object. Three-dimensional object printing is distinguishable from traditional object-forming techniques, which mostly rely on the removal of material from a work piece by a subtractive process, such as cutting or drilling.

Manufacturing of three-dimensional printed parts at high speed is a significant challenge because many of the processes involved are time consuming and often done manually. Automation has provided for higher speed and more efficient processing of three-dimensional printed parts. One area of concern relates to removal of the three-dimensional printed part from the build platen. Often the three-dimensional printed part sticks to the build platen and can be challenging to remove. Current methods for part removal include heating, impacting, scraping, and freezing. These methods are generally cumbersome, time consuming, and risk damaging the part or the build platen. What is needed is a method for removing a three-dimensional printed part from a build platen that is fast, reliable, and easily automated.

SUMMARY

A three-dimensional object printer has a platen that is configured to facilitate the release of object produced by the printer. The three-dimensional object printer includes a platen having a first layer and second layer, the first layer having a coefficient of thermal expansion that is different than a coefficient of thermal expansion of the second layer, an ejector head having at least one ejector configured to eject material onto a surface of the platen, a temperature control device operatively connected to the platen, the temperature control device being configured to change a temperature of the platen, and a controller operatively connected to the temperature control device and the ejector head. The controller is configured to operate the at least one ejector in the ejector head to eject the drops of material towards the surface of the platen and form layers of material with reference to digital image data of a three-dimensional object to produce the three-dimensional object on the surface of the platen and to operate the temperature control device to bend the platen by changing the temperature of the platen to release a three-dimensional object from the platen.

A method of manufacturing a three-dimensional object operates a platen configured to facilitate the release of objects produced by the printer. The method includes operating at least one ejector in an ejector head to eject the drops of material towards a surface of the platen and form layers of material with reference to digital image data of a three-dimensional object to produce the three-dimensional object on the surface of the platen, the platen having a first layer and second layer, the first layer having a coefficient of thermal expansion that is different than a coefficient of thermal expansion the second layer, and changing a temperature of the platen with a temperature control device to bend the platen and release the three-dimensional object from the platen.

BRIEF DESCRIPTION OF THE DRAWINGS

The foregoing aspects and other features of the printer and method are explained in the following description, taken in connection with the accompanying drawings.

DETAILED DESCRIPTION

Figure 1:
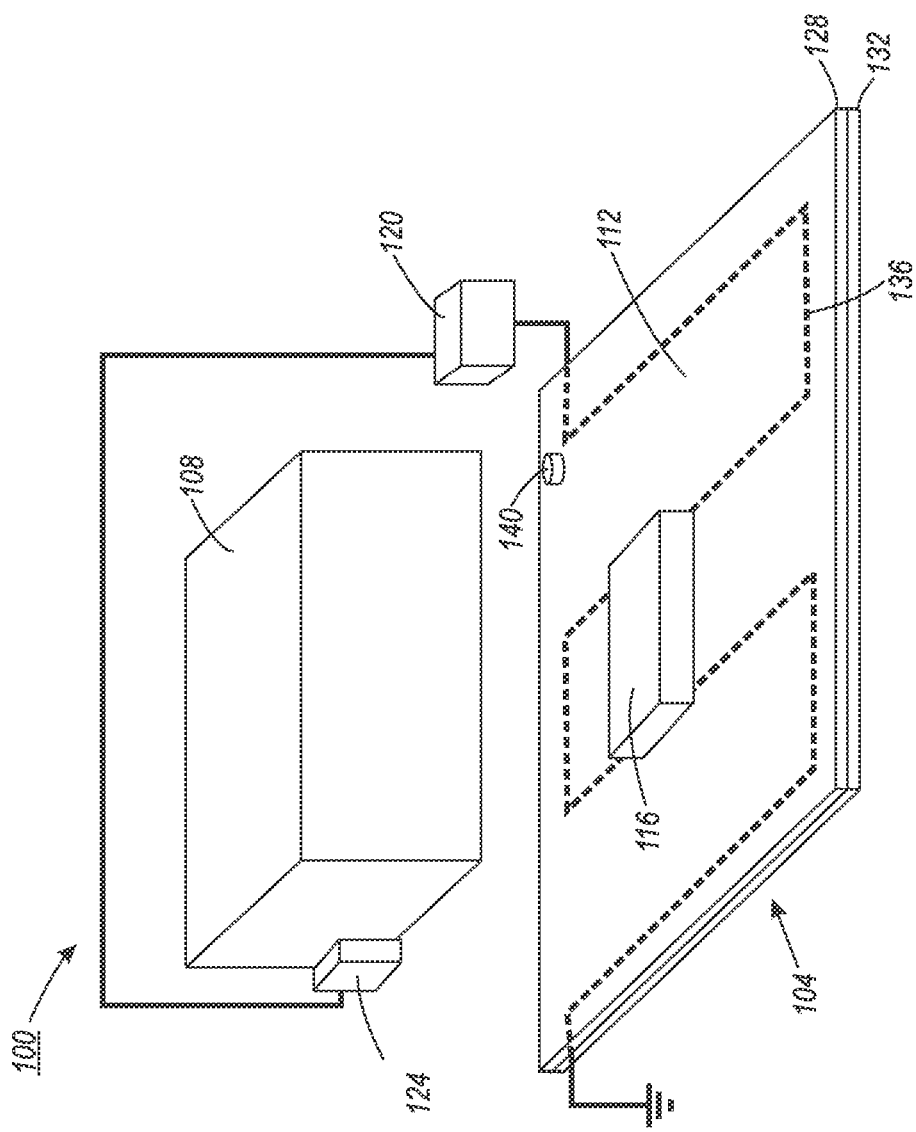
FIG. 1 shows a three-dimensional object printer.

For a general understanding of the environment for the printer and method disclosed herein as well as the details for the printer and method, reference is made to the drawings. In the drawings, like reference numerals designate like elements.

FIG. 1 shows a three-dimensional object printer 100. The printer 100 comprises a platen 104 and an ejector head 108. The ejector head 108 has a plurality of ejectors configured to eject material onto a surface 112 of the platen 104 to form a three-dimensional object, such as the part 116. In some embodiments, the ejector head 108 includes an ultraviolet light source configured to cure the material after it is ejected from the ejectors. In other embodiments, the ejector head 108 is configured to eject a material, such as a thermoplastic, which hardens without the need for curing. In some embodiments, the ejector head has a first plurality of ejectors configured to eject a build material and a second plurality of ejectors configured to eject a support material, such as wax. In one embodiment, the ejector head is configured to eject a layer of support material prior to forming the part 116. The support material is configured to be removed after printing by being melted away, dissolved by a solvent, or mechanically broken off.

The printer 100 further includes a temperature control device 120 configured to change a temperature of the platen 104. The printer 100 further includes a controller 124 operatively connected to the ejector head 108 and the temperature control device 120. The controller 124 is configured to operate the ejector head 108 and temperature control device 120.

Figure 2:
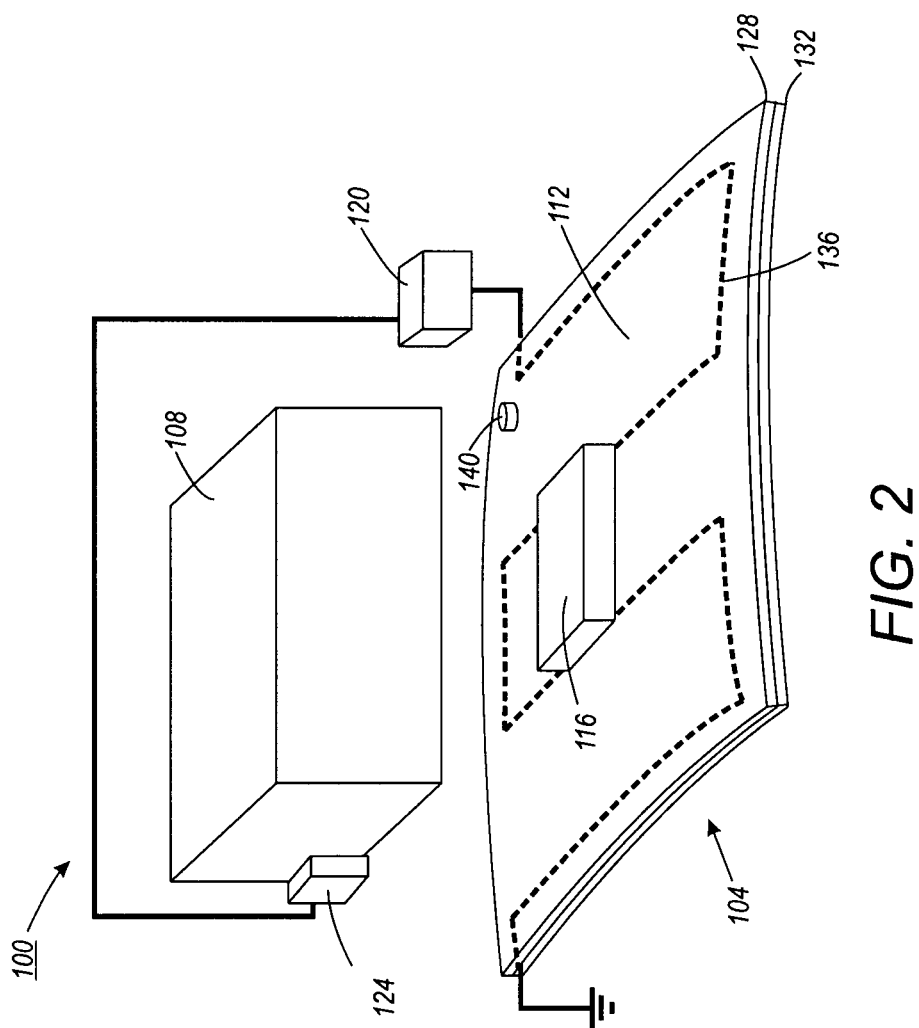
FIG. 2 shows the three-dimensional object printer of FIG. 1 having a bent platen.

The platen 104 comprises a first layer 128 and a second layer 132. The material of the first layer 128 is different from the material of the second layer 132. In one aspect, the two materials for the two layers have different coefficients of thermal expansion. In some embodiments, the platen 104 includes additional inert layers that do not substantially respond to temperature changes. This configuration enables the platen 104 to bend in response to a change in temperature of the platen 104. In one embodiment, the temperature control device 120 is configured to bend the platen 104 by heating the platen 104, as shown in FIG. 2. When heat is applied, the layer of the platen 104 having the larger coefficient of thermal expansion expands more rapidly than the layer having the smaller coefficient of thermal expansion, causing the edges of the platen 104 to bend toward the layer having the smaller coefficient of thermal expansion. In the embodiment of FIG. 2, the coefficient of thermal expansion of the first layer 128 is larger than the coefficient of thermal expansion of the second layer 132. Accordingly, when the temperature control device 120 applies heat to the platen 104, the edges of the platen 104 bend away from the ejector head 108, as shown in FIG. 2. As the platen 104 bends, the surface 112 becomes slightly convex in shape. The part 116 is generally formed of a rigid material such that, when the surface 112 bends into the convex shape, any adhesion between the part 116 and the surface 112 is broken, thereby releasing the part 116. Once released, the part 116 is easily removed from the platen 104 without risk of damage to the part 116 or the platen 104.

The way in which that the platen 104 bends is primarily a function of the change in temperature of the platen 104. A larger change in temperature of the platen 104 causes the platen 104 to bend more than a smaller change in temperature. Accordingly, the controller 124 is configured to operate the temperature control device 120 to change the temperature of the platen 104 to achieve a desired amount of bend in the platen 104. However, the manner in which the platen 104 is constructed defines precisely how the platen 104 responds to changes in temperature. The extent to which the platen 104 bends is a function of the relative magnitudes of the coefficients of thermal expansion of the layers of the platen 104. A platen having layers with coefficients of thermal of expansion that differ greatly bends more than a platen having coefficients of thermal of expansion that differ only slightly. In some embodiments, the platen 104 is a bimetallic plate wherein the first layer 128 is made of one type of metal and the second layer 132 is made of a second type of metal that is different than the metal of the first layer. In one aspect, the different types of metal have different coefficients of thermal expansion. In one embodiment, the first layer 128 is made of aluminum and the second layer 132 is made of steel. The thickness of the first layer 128 and the second layer 132 also affects the extent to which the platen 104 bends in response to a change in temperature. Thinner layers enable the platen 104 to bend more freely than thicker layers.

The manner in which the layers of the platen 104 are bonded or fastened to one another also affects the way in which the platen 104 bends. A platen having layers that are bonded across their entire joined surface is more resistant to bending than a platen having layers that are bonded only at their perimeter. Similarly, a platen having layers that are mechanically fastened to one another, such as with rivets, is more free to bend in response to changes in temperature than a platen having layers that are chemically bonded or welded to one another. A platen having layers that are joined in a non-uniform manner may bend more easily about one axis than another axis. In one embodiment, the first layer 128 and the second layer 132 of the platen 104 are non-uniformly bonded such that the platen 104 bends more easily about a preferred axis.

The design considerations discussed above are used to optimize the platen 104 for a particular printing process. Different build materials require a different amount of bend in the platen 104 to be effectively released from the platen 104. Furthermore, different build materials have varying sensitivities to excessive heat, which constrains the amount of heat that can be applied to platen 104. The platen 104 is fabricated to be substantially planar at a nominal temperature for printing. In some embodiments, the nominal temperature is a room temperature but, in other embodiments, is cooler or warmer than room temperature. In one embodiment, the platen 104 is fabricated such that it is flat at room temperature and bent when heated. In another embodiment, the platen 104 is fabricated such that it is flat when cooled and bent at room temperature. This embodiment may be particularly useful for use with build materials that are sensitive to excessive heat.

The temperature control device 120 is configured to change the temperature of the platen 104 between a nominal temperature at which the platen 104 is flat and a temperature at which the platen 104 is bent. Depending on the particular temperatures required, the temperature control device 120 includes a heating element, or a cooling element, or both types of elements. In one embodiment, the temperature control device 120 includes heating elements 136 that are disposed on or within the platen 104. The heating elements 136 are configured to heat the platen 104 in response a voltage being applied across the heating elements 136. In some embodiments, the temperature control device 120 includes thermo-electric coolers, heating pads, or thermistors for heating and cooling the platen 104. In some embodiments, the temperature control device 120 includes a temperature sensor 140 configured to measure the temperature of the platen 104. In one embodiment, the temperature control device 120 is operated with reference to a measured temperature of the platen 104 from the temperature sensor 140, essentially as a closed-loop feedback system. In another embodiment, the temperature control device 120 is operated based on a predictive model of the temperature of the platen 104, essentially as an open-loop control system.

Figure 3:
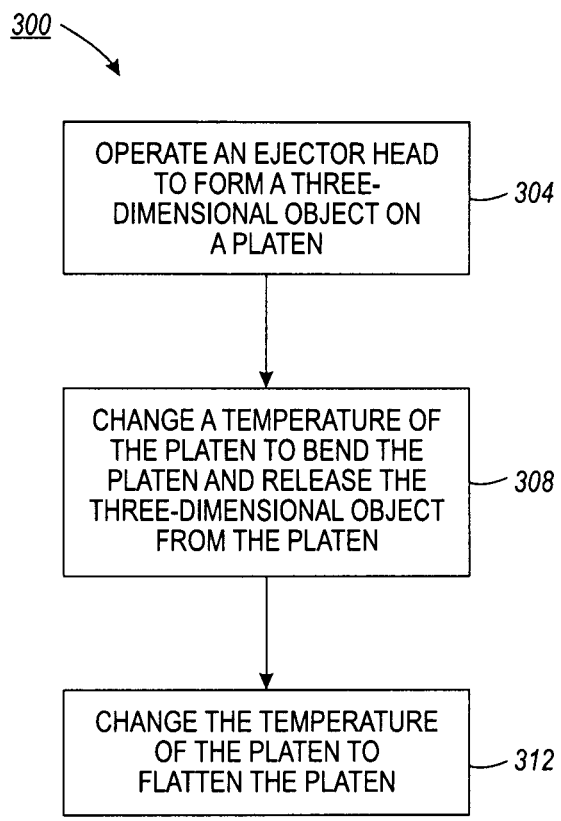
FIG. 3 shows a method for releasing a printed part from a platen.

A method 300 for operating the printer 100 to automatically release printed parts from the platen 104 is shown in FIG. 3. In the description of the method, statements that the method is performing some task or function refers to a controller or general purpose processor executing programmed instructions stored in non-transitory computer readable storage media operatively connected to the controller or processor to manipulate data or to operate one or more components in the printer to perform the task or function. The controller 124 noted above can be such a controller or processor. Alternatively, the controller can be implemented with more than one processor and associated circuitry and components, each of which is configured to form one or more tasks or functions described herein.

When the method 300 is performed it begins by operating an ejector head to form a three-dimensional object on a platen (block 304). The controller 124 operates the ejector head 108 to eject material onto the surface 112 of the platen 104 to form the part 116. In some embodiments, the controller 124 first operates the ejector head 108 to eject a layer of support material to form a support layer for the printing of the part 116. In the case where the platen 104 is not already flat, the controller 124 first operates the temperature control device 120 to change the temperature of the platen 104 to a nominal temperature at which the platen 104 is flat before operating the ejector head 108 to form the part 116. In some embodiments, the controller 124 operates the temperature control device 120 to maintain a temperature of the platen 104 during the formation of the part 116 on the platen 104.

After a three-dimensional object is formed on the platen, the method 300 changes a temperature of the platen to bend the platen and release the three-dimensional object from the platen (block 308). The controller 124 operates the temperature control device 120 to change the temperature of the platen 104 to a temperature at which the platen 104 is sufficiently bent to release the part 116. In one embodiment, the temperature control device 120 applies a voltage to the heating elements 136 to heat the platen 104. In one embodiment, the controller 124 or the temperature control device 120 receives a signal from the temperature sensor 140 that indicates the temperature of the platen 104. With reference to the measured temperature from the temperature sensor 140, the temperature control device 120 applies the voltage to the heating elements 136. As the platen 104 changes temperatures, the platen 104 bends, thereby releasing the part 116 from the surface 112 of the platen 104. The controller 124 or the temperature control device 120 monitors the signal from the temperature sensor 140 and waits for a predetermined time period to expire once the bending temperature is reached to help ensure the part 116 separates from the platen 104. The part 116 is removed from the platen 104 at or near the expiration of the predetermined time period. The part 116 can be removed by a robotic arm, an actuator tilting the platen 104 or other known removal method.

After the three-dimensional object is removed from the platen, the method 300 changes the temperature of the platen to flatten the platen (block 312). The controller 124 or temperature control device 120 decouples the heating elements 136, or other temperature changing elements operatively connected to the platen 104, from the voltage source to enable the platen 104 to return to its original shape. In other embodiments, the temperature of the platen 104 is actively controlled to return to its original shape, such as by cooling the platen 104. In some embodiments, the platen 104 is also cleaned by the controller operating at least one actuator to move a wiper across the surface of the platen to remove any remnant support material on the platen 104.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A three-dimensional object printer comprising:
   a platen having a first layer and second layer, one of the layers having a coefficient of thermal expansion that is greater than a coefficient of thermal expansion of the other layer, the first layer and the second layer are non-uniformly bonded to one another to enable the platen to bend about a predetermined axis;
   an ejector head having at least one ejector configured to eject drops of material onto a surface of the platen;
   a temperature control device operatively connected to the platen, the temperature control device being configured to change a temperature of the platen; and
   a controller operatively connected to the temperature control device and the ejector head, the controller being configured to:
      operate the at least one ejector in the ejector head to eject the drops of material towards the surface of the platen and form layers of material with reference to digital image data of a three-dimensional object to produce the three-dimensional object on the surface of the platen; and
      operate the temperature control device to heat the platen and cause the layer having the greater coefficient of thermal expansion to expand more rapidly than the other layer and bend the platen along the predetermined axis to release a three-dimensional object from the platen.

2. The printer of claim 1, the controller being further configured to:
   operate the temperature control device to flatten the platen.

3. The printer of claim 1, wherein the first layer of the platen is a first metal and the second layer of the platen is a second metal, the first metal being a different metal than the second metal.

4. The printer of claim 1, wherein the first layer of the platen is closer to the surface of the platen than the second layer of the platen and the coefficient of thermal expansion of the first layer of the platen is greater than the coefficient of thermal expansion of the second layer of the platen.

5. The printer of claim 1, the temperature control device further comprising:
   a heating element configured to heat the platen in response to a voltage being applied to the heating element; and
   the operation of the temperature control device to bend the platen further comprising:
      applying a voltage to the heating element to increase the temperature of the platen.

6. The printer of claim 1 further comprising:
   a temperature sensor configured to measure a temperature of the platen; and
   the controller being further configured to:
      operate the temperature sensor to measure the temperature of the platen; and
      operate the temperature control device with reference to the measured temperature of the platen.

7. The printer of claim 1, the controller being further configured to:
   operate the temperature control device to maintain a shape of the platen by maintaining a temperature of the platen.

8. The printer of claim 7, the controller being further configured to:
   operate the temperature control device to maintain a shape of the platen by maintaining a temperature of the platen while operating the at least one ejector in the ejector head to produce the three-dimensional object.

9. The three-dimensional object printer of claim 1 further comprising:
   a plurality of rivets that bond the first layer and the second layer non-uniformly.

10. The three-dimensional object printer of claim 1 wherein the first layer and the second layer are non-uniformly bonded chemically.

11. The three-dimensional object printer of claim 1 wherein the first layer and the second layer are bonded by welding the first layer and the second layer together non-uniformly.

12. A method of manufacturing a three-dimensional object comprising:
   operating at least one ejector in an ejector head to eject drops of material towards a surface of the platen and form layers of material with reference to digital image data of a three-dimensional object to produce the three-dimensional object on the surface of the platen, the platen having a first layer and second layer, the first layer having a coefficient of thermal expansion that is different than a coefficient of thermal expansion the second layer, and the first layer and the second layer are non-uniformly bonded to one another to enable the platen to bend about a predetermined axis; and changing a temperature of the platen with a temperature control device to bend the platen along the predetermined axis to release the three-dimensional object from the platen.

13. The method of claim 12, the changing of the temperature of the platen further comprising:
increasing the temperature of the platen with the temperature control device.

14. The method of claim 12, the changing of the temperature of the platen further comprising:
decreasing the temperature of the platen with the temperature control device.

15. The method of claim 12 further comprising:
changing the temperature of the platen to flatten the platen.

16. The method of claim 13, the increasing of the temperature to bend the platen further comprising:
applying a voltage to a heating element of the temperature control device configured to heat the platen.

17. The method of claim 12 further comprising:
measuring a temperature of the platen with a temperature sensor; and
changing the temperature of the platen with reference to the measured temperature of the platen.

18. The method of claim 12 further comprising:
operating the temperature control device to maintain a temperature of the platen to maintain a shape of the platen.

19. The method of claim 18, the controller being further configured to:
operating the temperature control device to maintain a temperature of the platen to maintain a shape of the platen while operating the at least one ejector in ejector head to produce the three-dimensional object.

* * * * *